United States Patent [19]

Heineke et al.

[11] Patent Number: 6,083,468
[45] Date of Patent: Jul. 4, 2000

[54] METHOD OF MANUFACTURING A HYDROGENATION CATALYST

[75] Inventors: Daniel Heineke, Ludwigshafen; Günther Achhammer, Mannheim; Heinz-Walter Schneider, Ludwigshafen; Alfred Thome, Speyer, all of Germany

[73] Assignee: BASF Aktiengesellschaft, Ludwigshafen, Germany

[21] Appl. No.: 09/155,908

[22] PCT Filed: Apr. 1, 1997

[86] PCT No.: PCT/EP97/01617

§ 371 Date: Oct. 8, 1998

§ 102(e) Date: Oct. 8, 1998

[87] PCT Pub. No.: WO97/37758

PCT Pub. Date: Oct. 16, 1997

[30] Foreign Application Priority Data

Apr. 10, 1996 [DE] Germany ............... 196 14 153

[51] Int. Cl.$^7$ ...................................... C01C 1/00
[52] U.S. Cl. ................... 423/352; 423/385; 423/387; 502/27; 502/168; 502/339
[58] Field of Search ............. 502/27, 168, 339; 423/239.1, 352, 385, 387

[56] References Cited

U.S. PATENT DOCUMENTS

| | | |
|---|---|---|
| 3,904,612 | 9/1975 | Nagasawa et al. |
| 3,960,829 | 6/1976 | Nagasawa et al. |
| 4,889,704 | 12/1989 | Fuchs et al. ............... 423/387 |
| 5,817,592 | 10/1998 | Heineke et al. ............... 502/185 |

FOREIGN PATENT DOCUMENTS

| | | |
|---|---|---|
| 1 166 636 | 5/1984 | Canada . |
| 46 856 | 3/1982 | European Pat. Off. . |
| 308 719 | 3/1989 | European Pat. Off. . |
| 334 121 | 9/1989 | European Pat. Off. . |
| 629 439 | 12/1994 | European Pat. Off. . |
| 43 11 420 | 10/1994 | Germany . |
| 1387 739 | 3/1975 | United Kingdom . |

OTHER PUBLICATIONS

Collect. Czech. Chem. Commun. 1973, 38(5), S. 1371–80.
Heterocycles, 1987, 26(8), S. 2223–2246.
Structure of metallic Catalyst, Anderson, Academic Press, 1975, S. 164 ff.
Katalytische Hydrierung im organisch chemischen Laboratorium, F. Zinalkowski, 164 ff.

*Primary Examiner*—Steven P. Griffin
*Assistant Examiner*—Christina Ildebrando
*Attorney, Agent, or Firm*—Keil & Weinkauf

[57] ABSTRACT

A hydrogenation catalyst is prepared by reduction of platinum in an oxidation state of not less than two using a reducing agent in an aqueous medium in the presence of a carbon-containing support after partial poisoning, where use is made of a compound of the general formula I

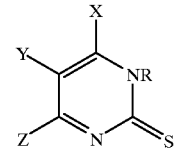

where X, Y and Z can be identical or different and are hydrogen, $C_1$–$C_{18}$-alkyl, $C_5$–$C_{10}$-cycloalkyl, halogen, hydroxyl, $C_1$–$C_6$-alkoxy and —NR'R", where R, R' and R" can be identical or different and can be hydrogen, $C_1$–$C_{18}$-alkyl or $C_5$–$C_{10}$-cycloalkyl. Such a hydrogenation catalyst can be used for preparing hydroxylammonium salts and the process for preparing the above catalysts can also be used for regenerating hydrogenation catalysts based on platinum.

6 Claims, No Drawings

METHOD OF MANUFACTURING A HYDROGENATION CATALYST

The present invention relates to a novel process for preparing a hydrogenation catalyst by reduction of platinum in an oxidation state of not less than two using a reducing agent in an aqueous medium in the presence of a carbon-containing support after partial poisoning.

Furthermore, the present invention also relates to a hydrogenation catalyst prepared by the process of the present invention, its use for preparing hydroxylammonium salts, a process for preparing hydroxylammonium salts and a process for regenerating hydrogenation catalysts based on platinum.

Suitable catalysts for hydrogenating organic and inorganic compounds are noble metals such as palladium, platinum or ruthenium which are applied to various supports such as silicon dioxide, aluminum oxide, graphite or activated carbon, as is known from "Katalytische Hydrierungen im organisch chemischen Laboratorium", F. Zimalkowski, Ferdinand Enke Verlag, Stuttgart (1965).

It is presumed that a high dispersion of the noble metal on the catalyst support is responsible for the activity of these catalysts. A disadvantage in terms of the process is the fact (see "Structure of Metallic Catalyst", J. R. Anderson, Academic Press (1975), pages 164ff) that under reaction conditions the particle size of the noble metal applied increases by agglomeration, the dispersion decreases and the elemental noble metal is detached from the support.

It is described in DE-C 40 22 853 that use of platinum/graphite support catalysts having a graphite particle size of 1-600 µM is able to increase the selectivity in respect of hydroxylamine in the hydrogenation of nitrogen monoxide.

DE-C 956038 has disclosed supported platinum/graphite catalysts which are obtained by precipitation of platinum onto suspended graphite supports, with or without addition of poisons such as sulfur, selenium, arsenic or tellurium compounds. Such catalysts are suitable for the catalytic hydrogenation of nitrogen monoxide.

It is described in DE-C 40 22 851 that in the preparation of hydroxylamine by hydrogenation of nitrogen monoxide in the presence of supported platinum/graphite catalysts, the selectivity is related to the apparent density, the compressive strength and porosity of the graphite support.

The catalysts used in the processes of the abovementioned German patents have the disadvantage that, owing to agglomeration of the active components, only relatively short operating lives of the catalysts can be achieved.

It is an object of the present invention to provide an improved process for preparing hydrogenation catalysts which ensures longer operating lives of the catalysts used with at least the same selectivity and a high space-time yield. Furthermore, a minimization of the by-products, in particular dinitrogen monoxide, should be achieved.

We have found that this object is achieved by a process for preparing a hydrogenation catalyst by reduction of platinum in an oxidation state of not less than two using a reducing agent in an aqueous medium in the presence of a carbon-containing support after partial poisoning, wherein use is made of a compound of the general formula I

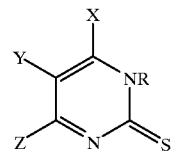

where X, Y and Z can be identical or different and are hydrogen, $C_1$–$C_{18}$-alkyl, $C_5$–$C_{10}$-cycloalkyl, halogen, hydroxyl, $C_1$–$C_6$-alkoxy and —NR'R", where R, R' and R" can be identical or different and can be hydrogen, $C_1$–$C_{18}$-alkyl or $C_5$–$C_{10}$-cycloalkyl.

Furthermore, a hydrogenation catalyst prepared by the process of the present invention, its use for preparing hydroxylammonium salts, a process for preparing hydroxylammonium salts and a process for regenerating hydrogenation catalysts based on platinum have been found.

As $C_1$–$C_{18}$-alkyl radicals, preference is given to using $C_1$–$C_8$-alkyl such as methyl, ethyl, n-propyl, i-propyl, n-butyl, i-, sec-, tert-butyl, n-pentyl, neo-pentyl, n-hexyl, n-heptyl, n-octyl, particularly preferably $C_1$–$C_4$-alkyl such as methyl, ethyl, n-propyl, i-propyl, n-butyl, i-, sec- and tert-butyl.

As $C_5$–$C_{10}$-cycloalkyl radicals, preference is given to using cyclopentyl, cyclohexyl, cycloheptyl, cyclooctyl, cyclononyl, cyclodecyl, particularly preferably cyclopentyl and cyclohexyl.

Halogens used can be fluorine, chlorine and bromine, preferably chlorine.

$C_1$–$C_6$-Alkoxy radicals used can be methoxy, ethoxy, n-propoxy, i-propoxy, n-butoxy, n-pentoxy and n-hexoxy, preferably methoxy and ethoxy.

As R, R' and R" it is possible to use the abovementioned radicals, with $C_1$–$C_8$-alkyl such as methyl, ethyl, n-propyl, i-propyl, n-butyl, i-, sec-, tert-butyl, n-pentyl, neo-pentyl, n-hexyl, n-heptyl, n-octyl and $C_5$–$C_{10}$-cycloalkyl radicals such as cyclopentyl, cyclohexyl, cycloheptyl, cyclooctyl, cyclononyl and cyclodecyl being preferred and $C_1$–$C_4$-alkyl such as methyl, ethyl, n-propyl, i-propyl, n-butyl, i-, sec- and tert-butyl and also cyclopentyl and cyclohexyl being particularly preferred.

Particularly preferred poisons of the formula I are, according to observations up to now, 4- and/or 6-substituted derivatives of 2-mercaptopyrimidine, among which 4-amino-2-mercaptopyrimidine and 4-amino-6-hydroxy-2-mercaptopyrimidine are particularly preferred.

Of the compounds of the formula I, in particular the particularly preferred derivatives of 2-mercaptopyrimidine, some are commercially available or they can be prepared by methods as described in Heterocycles (1987), 26(8), 2223–46; Collect. Czech. Chem. Commun. (1973), 38(5), 1371–80 or in DE-A 2 246 334 and EP-A 46 856.

The hydrogenation catalysts are generally prepared in a manner known per se (see DE-C 40 22 853) by reducing a platinum compound in an oxidation state of not less than two, preferably a platinum(IV) compound, in aqueous solution in the presence of a carbon-containing support to platinum(0) where, prior to addition of the reducing agent, a compound of the formula I is added to partially poison the catalyst, advantageously after buffering the solution with an alkali metal acetate.

After addition of the poison of the general formula I, the platinum(IV) can be directly precipitated with a reducing agent to give platinum(0). Preferred reducing agents are formic acid, formaldehyde, sodium formate and other alkali metal formates such as potassium formate and ammonium formate.

Suitable platinum compounds having an oxidation state of not less than two are, in particular, the water-soluble platinum(IV) compounds such as hexachloroplatinic acid and its alkali metal and ammonium salts.

Carbon-containing supports used are generally suspended graphite or activated carbons, in particular types of electrographite, particularly preferably those types of electrographite which have a particle size in the range from 0.5 to 600 μm, preferably from 2 to 50 μm. Suitable particle size ranges are obtainable by customary sieving techniques. The amount of platinum is generally from 0.2 to 2% by weight, preferably from 0.5 to 1% by weight, based on the total mass of supported platinum/graphite catalyst.

The molar ratio of platinum to poison of the formula I is usually selected in the range from 20:1 to 3:1, preferably from 10:1 to 5:1.

The partial poisoning is usually carried out by methods known per se, as are described, for example, in DE-C 40 22 853.

The reduction of the platinum is generally carried out in an aqueous solution, with the weight ratio of water to platinum generally being selected in the range from 1000:1 to 100:1, preferably from 500:1 to 100:1.

Furthermore, the reduction is carried out in the slightly acid or neutral region, with the pH usually being from 4.5 to 7, preferably from 5 to 6. The pH is generally set by addition of buffer salts such as alkali metal acetate, in particular sodium acetate.

The molar ratio of reducing agent to platinum is generally selected in the range from 1000:1 to 10:1, preferably from 100:1 to 20:1.

The temperature during the reduction is generally selected in the range from 50 to 95° C., preferably from 60 to 90° C.

Furthermore, it is advantageous to work under atmospheric pressure.

After the reduction is complete, the catalyst is generally worked up in a customary manner, for example by filtering it off from the reaction mixture and advantageously washing it with water.

In a preferred embodiment, a platinum(IV) compound, in particular hexachloroplatinic(IV) acid hexahydrate, is treated in the presence of graphite with a mixture of hydrochloric acid and nitric acid at from 40 to 95° C., in particular from 70 to 85° C., for a period of from 6 to 48 hours, in particular from 12 to 30 hours. Sodium carbonate, for preference, is then added to the suspension and the pH is brought into a range from 1.5 to 3.5, preferably from 2 to 3, in particular 2.75. Subsequently, the suspension obtained is preferably buffered by addition of sodium acetate. The suspension thus obtained is, according to observations up to now, particularly suitable for preparing the catalysts of the present invention by subjecting this suspension, as described above, to a poisoning step with subsequent reduction of platinum.

The catalysts obtained by the process of the present invention are, according to observations up to now, suitable for hydrogenating both organic and inorganic compounds.

The catalysts of the present invention are preferably used for the hydrogenation of olefinically or acetylenically unsaturated compounds, also for the hydrogenation of carboxylic acids, aldehydes or ketones to give the corresponding alcohols or of nitriles to give the corresponding amines. Furthermore, the catalysts of the present invention are suitable for hydrogenating inorganic materials such as oxygen, but in particular for preparing hydroxylammonium salts by hydrogenation of nitrogen monoxide in aqueous mineral acids.

In the preparation of hydroxylammonium salts, a molar ratio of hydrogen to nitrogen monoxide of from 1.5:1 to 6:1, preferably 3.5–5:1, is generally employed. According to observations up to now, particularly good results are obtained if care is taken to ensure that a molar ratio of hydrogen to nitrogen monoxide of from 3.5:1 to 5:1 is maintained in the reaction zone.

Acids used are advantageously strong mineral acids such as nitric acid, sulfuric acid or phosphoric acid or aliphatic $C_1$–$C_5$-monocarboxylic acids such as formic, acetic, propionic, butyric and valeric acid, preferably formic acid and acetic acid. Also suitable are acid salts such as ammonium bisulfate. In general, 4–6 Normal aqueous acids are employed and the acid concentration is usually not allowed to drop below 0.2 Normal during the course of the reaction.

The hydrogenation of nitrogen monoxide is generally carried out at from 30 to 80° C., preferably from 35 to 60° C., and the pressure during the hydrogenation is usually selected in the range from 1 to 30 bar, preferably from 1 to 20 bar (absolute).

The ratio of mineral acid to catalyst depends essentially on the platinum metal and the reactor pressure and in the case of platinum is generally in the range from 1 to 100, preferably from 20 to 80, g of platinum/graphite catalyst per liter of mineral acid.

In a further preferred embodiment, particularly in the preparation of hydroxylammonium salts, the catalyst is, prior to the hydrogenation, treated with hydrogen ("activation") in acid solution, advantageously in the mineral acid in which the hydrogenation is to be carried out.

Exhausted platinum metal catalysts can be regenerated with the aid of the process of the present invention by bringing the platnum metal of the catalyst into solution, usually by means of an acid or an acid mixture, preferably nitric acid or a nitric acid/hydrochloric acid mixture, and if necessary separating off insoluble constituents. Subsequently, the platinum metal salt solution obtained is generally neutralized and the platinum metal salt is then treated by the above-described process of the present invention.

The catalysts of the present invention are, according to observations up to now, superior in terms of selectivity and operating life to known catalysts for the same purpose and give similarly high, in some cases higher space-time yields. The process of the present invention for preparing and for regenerating hydrogenation catalysts has the advantage compared with known processes that it is simpler to carry out and at the same time reduces the amounts of waste products.

EXAMPLES

The particle size was determined using a Malvern Mastersizer (see also Verfahrenstechnik 24 (1990) pp. 36ff). The Fraunhofer diffraction was measured at a wavelength of 633 nm. The particle size distribution was measured in a range from 1 to 600 μm by selection of an attachment lens having a focal length of f=300 nm.

For the measurement, a spatula tip of the powder to be examined was added to one liter of a 0.1% strength by weight aqueous Nekanil® 910 solution (BASF AG; Nekanil® 910 is a nonylphenol reacted with 9–10 mol of ethylene oxide; properties: water-white, viscous liquid; nonionic, density at 20° C.: 1.0 g/cm$^3$; pour point: below −10° C.; pH of a 1% strength by weight solution: 6.5–8.5). Prior to the measurement, the resulting mixture to be examined was subjected to ultrasound treatment for 1 minute.

Example 1 a) 40 g of a graphite from Asbury having a particle size of from 28 to 68 μm and 0.5310 g of hexachloroplatinic(IV)

acid hexahydrate were stirred overnight at 80° C. with 40 ml of an aqueous solution containing 3.87 ml of concentrated hydrochloric acid and 0.87 ml of concentrated nitric acid. The suspension obtained was treated with sodium carbonate until a pH of 2.75 had been reached. Subsequently, 2.5 g of sodium acetate were added to buffer the mixture. 31.5 mg of 4-amino-6-hydroxy-2-mercaptopyrimidine hydrate were then added and, after a pause of 2 minutes, the suspension thus obtained was admixed with 14.1 g of a 40% strength by weight, aqueous sodium formate solution (83 mmol) and stirred for 4 hours at 80° C. After this time, platinum could no longer be detected by means of hydrazine hydrate (gives a black precipitate in alkaline solution in the presence of platinum).

The catalyst thus prepared was separated from the reaction mixture by filtration through a glass frit and washed with distilled water until the pH of the washings was no longer in the acid region. The dried catalyst contained 0.5% by weight of platinum.

b) 3.6 g of the catalyst prepared under a) were suspended in 120 ml of 4.3 N sulfuric acid and 7.75 /l h of a mixture of 35% by volume of nitrogen monoxide and 65% by volume of hydrogen were passed in at 40° C. while stirring vigorously (3500 rpm). After 4 hours, the catalyst was separated off and the liquid phase was analyzed. Subsequently, the catalyst separated off was admixed with 120 ml of 4.3 N sulfuric acid and the reaction was continued. This procedure was repeated every four hours. The reaction was stopped after the selectivity in respect of the dinitrogen monoxide formed exceeded the prescribed upper limit of 10%. The experimental results are shown in the table below.

Example 2 a) 40 g of a graphite from Asbury having a particle size of from 28 to 68 μm and 0.5310 g of hexachloroplatinic(IV) acid hexahydrate were stirred overnight at 80° C with 40 ml of an aqueous solution containing 3.87 ml of concentrated hydrochloric acid and 0.87 ml of concentrated nitric acid. The suspension obtained was treated with sodium carbonate until a pH of 2.75 had been reached. Subsequently, 2.5 g of sodium acetate were added to buffer the mixture. 25 mg of 4-amino-2-mercaptopyrimidine were then added and, after a pause of 2 minutes, the suspension thus obtained was admixed with 6.25 ml of concentrated formic acid (166 mmol) and stirred for 4 hours at 80° C. After this time, platinum could no longer be detected by means of hydrazine hydrate.

The catalyst thus prepared was separated from the reaction mixture by filtration through a glass frit and washed with distilled water until the pH of the washings was no longer in the acid region. The dried catalyst contained 0.5% by weight of platinum.

b) 3.6 g of the catalyst prepared under a) were suspended in 120 ml of 4.3 N sulfuric acid and 7.75 /l h of a mixture of 35% by volume of nitrogen monoxide and 65% by volume of hydrogen were passed in at 40° C. while stirring vigorously (3500 rpm). After 4 hours, the catalyst was separated off and the liquid phase was analyzed. Subsequently, the catalyst separated off was admixed with 120 ml of 4.3 N sulfuric acid and the reaction was continued. This procedure was repeated every four hours. The reaction was stopped after the selectivity in respect of the dinitrogen monoxide formed exceeded the prescribed upper limit of 10%. The experimental results are shown in the table below.

Example 3 a) 40 g of a graphite from Asbury having a particle size of from 28 to 68 μm and 0.5310 g of hexachloroplatinic(IV) acid hexahydrate were stirred overnight at 80° C with 40 ml of an aqueous solution containing 3.87 ml of concentrated hydrochloric acid and 0.87 ml of concentrated nitric acid. The suspension obtained was treated with sodium carbonate until a pH of 2.75 had been reached. Subsequently, 2.5 g of sodium acetate were added to buffer the mixture. 31.5 mg of 4-amino-6-hydroxy-2-mercaptopyrimidine hydrate were then added and, after a pause of 2 minutes, the suspension thus obtained was admixed with 6.25 ml of concentrated formic acid (166 mmol) and stirred for 4 hours at 80° C. After this time, platinum could no longer be detected by means of hydrazine hydrate.

The catalyst thus prepared was separated from the reaction mixture by filtration through a glass frit and washed with distilled water until the pH of the washings was no longer in the acid region. The dried catalyst contained 0.5% by weight of platinum.

b) 3.6 g of the catalyst prepared under a) were suspended in 120 ml of 4.3 N sulfuric acid and 7.75 /l h of a mixture of 35% by volume of nitrogen monoxide and 65% by volume of hydrogen were passed in at 40° C. while stirring vigorously (3500 rpm). After 4 hours, the catalyst was separated off and the liquid phase was analyzed. Subsequently, the catalyst separated off was admixed with 120 ml of 4.3 N sulfuric acid and the reaction was continued. This procedure was repeated every four hours. The reaction was stopped after the selectivity in respect of the dinitrogen monoxide formed exceeded the prescribed upper limit of 10%. The experimental results are shown in the table below.

Comparative Example 1 a) 40 g of a graphite from Asbury having a particle size of from 28 to 68 μm and 0.5310 g of hexachloroplatinic(IV) acid hexahydrate were stirred overnight at 80° C. with 40 ml of an aqueous solution containing 3.87 ml of concentrated hydrochloric acid and 0.87 ml of concentrated nitric acid. The suspension obtained was treated with sodium carbonate until a pH of 2.75 had been reached. Subsequently, 2.5 g of sodium acetate were added to buffer the mixture. 6.25 mg of elemental sulfur were then added and, after a pause of 2 minutes, the suspension thus obtained was admixed with 14.1 g of a 40% strength by weight aqueous sodium formate solution 83 mmol) and stirred for 4 hours at 80° C. After this time, platinum could no longer be detected by means of hydrazine hydrate.

The catalyst thus prepared was separated from the reaction mixture by filtration through a glass frit and washed with distilled water until the pH of the washings was no longer in the acid region. The dried catalyst contained 0.5% by weight of platinum.

b) 3.6 g of the catalyst prepared under a) were suspended in 120 ml of 4.3 N sulfuric acid and 7.75 /l h of a mixture of 35% by volume of nitrogen monoxide and 65% by volume of hydrogen were passed in at 40° C. while stirring vigorously (3500 rpm). After 4 hours, the catalyst was separated off and the liquid phase was analyzed. Subsequently, the catalyst separated off was admixed with 120 ml of 4.3 N sulfuric acid and the reaction was continued. This procedure was repeated every four hours. The reaction was stopped after the selectivity in respect of the dinitrogen monoxide formed exceeded the prescribed upper limit of 10%. The experimental results are shown in the table below.

Example 4 a) 40 g of a graphite from Becker Pennrich having a particle size of from 28 to 50 μm and 0.5310 g of hexachloroplatinic(IV) acid hexahydrate were stirred overnight at 80° C with ml of an aqueous solution containing 3.87 ml of concentrated hydrochloric acid and 0.87 ml of concentrated nitric acid. The suspension obtained was treated with sodium carbonate until a pH of 2.75 had been reached. Subsequently, 2.5 g of sodium acetate were added to buffer the mixture. 26 mg of 4-amino-2-mercaptopyrimidine were then added and, after a pause of 2 minutes, the suspension thus obtained was admixed with 6.25 ml of concentrated formic acid (166 mmol) and stirred for 4 hours at 80° C. After this time, platinum could no longer be detected by means of hydrazine hydrate.

The catalyst thus prepared was separated from the reaction mixture by filtration through a glass frit and washed with distilled water until the pH of the washings was no longer in the acid region. The dried catalyst contained 0.5% by weight of platinum.

b) 4.8 g of the catalyst prepared under a) were suspended in 120 ml of 4.3 N sulfuric acid and 7.75 /l h of a mixture of 35% by volume of nitrogen monoxide and 65% by volume of hydrogen were passed in at 40° C. while stirring vigorously (3500 rpm). After 4 hours, the catalyst was separated off and the liquid phase was analyzed. Subsequently, the catalyst separated off was admixed with 120 ml of 4.3 N sulfuric acid and the reaction was continued. This procedure was repeated every four hours.

The reaction was stopped after the selectivity in respect of the dinitrogen monoxide formed exceeded the prescribed upper limit of 10%. The experimental results are shown in the table below.

Example 5 a) 40 g of a graphite from Becker Pennrich having a particle size of from 28 to 50 μm and 0.5310 g of hexachloroplatinic(IV) acid hexahydrate were stirred overnight at 80° C. with ml of an aqueous solution containing 3.87 ml of concentrated hydrochloric acid and 0.87 ml of concentrated nitric acid. The suspension obtained was treated with sodium carbonate until a pH of 2.75 had been reached. Subsequently, 2.5 g of sodium acetate were added to buffer the mixture. 38.5 mg of 4-amino-6-hydroxy-2-mercaptopyrimidine hydrate were then added and, after a pause of 2 minutes, the suspension thus obtained was admixed with 6.25 ml of concentrated formic acid (166 mmol) and stirred for 4 hours at 80° C. After this time, platinum could no longer be detected by means of hydrazine hydrate.

The catalyst thus prepared was separated from the reaction mixture by filtration through a glass frit and washed with distilled water until the pH of the washings was no longer in the acid region. The dried catalyst contained 0.5% by weight of platinum.

b) 4.8 g of the catalyst prepared under a) were suspended in 120 ml of 4.3 N sulfuric acid and 7.75 /l h of a mixture of 35% by volume of nitrogen monoxide and 65% by volume of hydrogen were passed in at 40° C. while stirring vigorously (3500 rpm). After 4 hours, the catalyst was separated off and the liquid phase was analyzed. Subsequently, the catalyst separated off was admixed with 120 ml of 4.3 N sulfuric acid and the reaction was continued. This procedure was repeated every four hours. The reaction was stopped after the selectivity in respect of the dinitrogen monoxide formed exceeded the prescribed upper limit of 10%. The experimental results are shown in the table below.

Comparative Example 2 a) 40 g of a graphite from Becker Pennrich having a particle size of from 28 to 50 μm and 0.5310 g of hexachloroplatinic(IV) acid hexahydrate were stirred overnight at 80° C with 40 ml of an aqueous solution containing 3.87 ml of concentrated hydrochloric acid and 0.87 ml of concentrated nitric acid. The suspension obtained was treated with sodium carbonate until a pH of 2.75 had been reached. Subsequently, 2.5 g of sodium acetate were added to buffer the mixture. 6.25 mg of elemental sulfur were then added and, after a pause of 2 minutes, the suspension thus obtained was admixed with 6.25 ml of concentrated formic acid (166 mmol) and stirred for 4 hours at 80° C. After this time, platinum could no longer be detected by means of hydrazine hydrate.

The catalyst thus prepared was separated from the reaction mixture by filtration through a glass frit and washed with distilled water until the pH of the washings was no longer in the acid region. The dried catalyst contained 0.5% by weight of platinum.

b) 4.8 g of the catalyst prepared under a) were suspended in 120 ml of 4.3 N sulfuric acid and 7.75 /l h of a mixture of 35% by volume of nitrogen monoxide and 65% by volume of hydrogen were passed in at 40° C. while stirring vigorously (3500 rpm). After 4 hours, the catalyst was separated off and the liquid phase was analyzed. Subsequently, the catalyst separated off was admixed with 120 ml of 4.3 N sulfuric acid and the reaction was continued. This procedure was repeated every four hours. The reaction was stopped after the selectivity in respect of the dinitrogen monoxide formed exceeded the prescribed upper limit of 10%. The experimental results are shown in the table below.

TABLE

Experimental results

| Example | 1 | 2 | 3 | Comparative Example 1 |
|---|---|---|---|---|
| Number of cycles | 17 | 13 | 14 | 4 |
| Selectivity $NH_2OH$ [%] | 86.58 | 85.44 | 86.33 | 84.25 |
| Selectivity $NH_3$ [%] | 10.39 | 9.68 | 10.32 | 12.61 |
| Selectivity $N_2O$ [%] | 2.85 | 4.88 | 3.34 | 3.15 |
| NO conversion [%] | 92.23 | 87.44 | 90.77 | 95.57 |
| Space-time yield | 0.808 | 0.757 | 0.791 | 0.812 |

| Example | 4 | 5 | Comparative Example 2 |
|---|---|---|---|
| Number of cycles | 5 | 6 | 3 |
| Selectivity $NH_2OH$ [%] | 87.6 | 89.2 | 81.8 |
| Selectivity $NH_3$ [%] | 6.3 | 5.8 | 12.04 |
| Selectivity $N_2O$ [%] | 6.1 | 6.0 | 6.2 |
| NO conversion [%] | 87.1 | 92.5 | 90.75 |
| Space-time yield | 0.774 | 0.800 | 0.749 |

The selectivities are calculated as average values of the selectivities over all cycles.

What is claimed is:

1. A process for producing a partially poisoned, supported platinum hydrogenation catalyst, which process comprises treating an aqueous solution of a platinum compound comprising platinum in an oxidation state of not less than two with an effective amount of a compound of the formula I

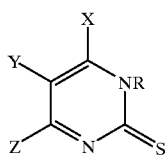

where X, Y and Z are identical or different and denote hydrogen, $C_1$–$C_{18}$-alkyl, $C_5$–$C_{10}$-cycloalkyl, halogen, hydroxyl, $C_1$–$C_6$-alkoxy or —NR'R", and R, R' and R" are identical or different and denote hydrogen, $C_1$–$C_{18}$-alkyl or $C_5$–$C_{10}$-cycloalkyl, to partially poison the platinum catalyst and reducing the treated platinum compound in the presence of a carbon-containing support.

2. The process defined in claim 1, wherein formula I represents 4-amino-2-mercaptopyrimidine.

3. The process defined in claim 1, wherein formula I represents 4-amino-6-hydroxy-2-mercaptopyrimidine.

4. A hydrogenation catalyst obtained by the process defined in claim 1.

5. A process for preparing hydroxylammonium salts which comprises reducing nitrogen monoxide with hydrogen in an aqueous mineral acid in the presence of a hydrogenation catalyst obtained by the process defined in claim 1.

6. A process for regenerating a used hydrogenation catalyst based on platinum, which process comprises treating a used catalyst comprising platinum with an acid or acid mixture to give a solution comprising the platinum in the form of a platinum compound, optionally separating the solution from insoluble constituents, treating the platinum compound with an effective amount of a compound of the formula I

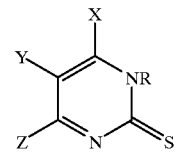

where X, Y and Z are identical or different and denote hydrogen, $C_1$–$C_{18}$-alkyl, $C_5$–$C_{10}$-cycloalkyl, halogen, hydroxyl, $C_1$–$C_6$-alkoxy or —NR'R", and R, R' and R" are identical or different and denote hydrogen, $C_1$–$C_{18}$-alkyl or $C_5$–$C_{10}$-cycloalkyl, to partially poison the platinum catalyst and reducing the treated platinum compound in the presence of a carbon-containing support.

* * * * *